United States Patent [19]
Yamashita et al.

[11] Patent Number: 5,555,499
[45] Date of Patent: Sep. 10, 1996

[54] TRACTION CONTROL SYSTEM FOR VEHICLE

[75] Inventors: Tetsuhiro Yamashita; Koji Hirai, both of Hiroshima-ken, Japan

[73] Assignee: Mazda Motor Corporation, Hiroshima-ken, Japan

[21] Appl. No.: 287,221

[22] Filed: Aug. 8, 1994

[30] Foreign Application Priority Data

Aug. 20, 1993 [JP] Japan .................................. 5-228303

[51] Int. Cl.$^6$ ...................................... B60T 8/58
[52] U.S. Cl. ...................... 364/426.03; 180/197
[58] Field of Search ...................... 364/426.02, 426.03, 364/426.01; 180/197

[56] References Cited

U.S. PATENT DOCUMENTS

| | | | |
|---|---|---|---|
| 4,976,330 | 12/1990 | Matsumoto | 364/426.02 |
| 4,985,836 | 1/1991 | Hashiguchi et al. | 364/426.02 |
| 5,245,542 | 9/1993 | Itoh et al. | 364/426.02 |
| 5,255,192 | 10/1993 | Ito et al. | 364/426.02 |
| 5,270,933 | 12/1993 | Fennel et al. | 364/426.01 |
| 5,276,624 | 1/1994 | Ito et al. | 364/426.01 |
| 5,287,941 | 2/1994 | Masuda et al. | 364/426.03 |
| 5,315,519 | 5/1994 | Chin et al. | 364/426.02 |
| 5,329,453 | 7/1994 | Tsuyama et al. | 364/426.02 |

FOREIGN PATENT DOCUMENTS 3286157 12/1991 Japan .

*Primary Examiner*—Gary Chin
*Attorney, Agent, or Firm*—Sixbey, Friedman, Leedom & Ferguson, PC; Gerald J. Ferguson, Jr.; Donald R. Studebaker

[57] ABSTRACT

In a traction control system for a vehicle, the rate of slip of the driving wheels is calculated on the basis of the rotational speed of the driving wheels and the vehicle speed and the output power of the engine is controlled with a control gain so that the rate of slip of the driving wheels converges on a predetermined target value when the rate of slip of the driving wheels exceeds a predetermined threshold value. The control gain of the engine control for reducing the output power of the engine is set larger when the vehicle is making a turn than when the vehicle is running straight.

8 Claims, 4 Drawing Sheets

TRACTION CONTROL SYSTEM FOR VEHICLE

BACKGROUND OF THE INVENTION

1. Field of the Invention

This invention relates to a traction control system for a vehicle, and more particularly to a traction control system for a vehicle for preventing side slip of the vehicle during a turning.

2. Description of the Prior Art

There has been known a traction control system for a vehicle which controls the traction of the vehicle in order to prevent deterioration of the accelerating performance due to slip of the driving wheels caused by an excessive driving torque, for instance, during acceleration.

In the traction control, generally, the rate of slip of the driving wheels is determined as the difference between the driving wheel speed (the rotational speed of the driving wheels) and the vehicle speed calculated on the basis of the rotational speed of the driven wheels, and the engine output is controlled by fuel injection control and/or ignition timing control so that the rate of slip of the driving wheels converges on a predetermined target value.

However since the rate of slip of the driving wheels is determined solely depending on the speed of rotation of the driving wheels about the drive shaft, side slip of the vehicle due to the lateral acceleration generated during a turning cannot be satisfactorily prevented by the conventional traction control system.

That is, when the vehicle is making a turn, a lateral acceleration directed outward of the turn is generated on the vehicle body and the vehicle is apt to slip sideways. Accordingly, when the engine output is controlled during a turning with a control variable whose value is the same as during a straight running, the output torque of the engine is kept equal to that during a straight running and the gripping force of the wheels is not changed though a larger gripping force of the driving wheels is required to resist the lateral acceleration.

Further when the vehicle is running straight, the driving force of the vehicle acts as a forward propelling force as it is. However when the vehicle is making a turn, the driving force is divided into the outward lateral acceleration and the forward propelling force, which result in reduction of the forward propelling force and reduction in the rotational speed of the driving wheels. When the rotational speed of the driving wheels lowers, the rate of slip of the driving wheels as calculated on the basis of the rotational speed of the driving wheels reduces and the control variable of the engine output becomes smaller as compared with when the vehicle is running straight, whereby the engine torque is less reduced during a turning. This problem takes place in parallel to the aforesaid problem and accordingly, it becomes difficult to stably steer the vehicle along a curve.

SUMMARY OF THE INVENTION

In view of the foregoing observations and description, the primary object of the present invention is to effectively suppress side slip of the vehicle, thereby improving the running stability of the vehicle, by ensuring a sufficient gripping force of the driving wheels during a turning.

The traction control system in accordance with the present invention is for a vehicle having an engine, driving wheels and driven wheels and comprises a driven wheel speed detecting means which detects the rotational speed of the driven wheels, a driving wheel speed detecting means which detects the rotational speed of the driving wheels, a vehicle speed detecting means which calculates the vehicle speed on the basis of the rotational speed of the driven wheels detected by the driven wheel speed detecting means, a slip rate calculating means which calculates the rate of slip of the driving wheels on the basis of the rotational speed of the driving wheels detected by the driving wheel speed detecting means and the vehicle speed calculated by the vehicle speed calculating means, an engine control means which controls the output power of the engine with a control gain so that the rate of slip of the driving wheels converges on a predetermined target value when the rate of slip of the driving wheels exceeds a predetermined threshold value, a control gain setting means which sets the control gain with which the engine control means controls the output power of the engine, and a turning condition detecting means which detects that the vehicle is making a turn, said control gain setting means setting the control gain of the engine control means for reducing the output power of the engine to be larger when the turning condition detecting means detects that the vehicle is making a turn than when the vehicle is running straight.

In one embodiment of the present invention, said turning condition detecting means includes a steering angle detecting means which detects the turning angle of a steering wheel and a lateral acceleration detecting means which detects the lateral acceleration of the vehicle, and the turning condition detecting means detects that the vehicle is making turn when a value derived from one of the turning angle of the steering wheel and the lateral acceleration exceeds a first reference value.

In another embodiment of the present invention, said control gain setting means reduces the control gain, which has been enlarged since the value derived from one of the turning angle of the steering wheel and the lateral acceleration exceeds the first reference value, when the value further exceeds a second reference value larger than the first reference value.

In still another embodiment of the present invention, said control gain setting means sets the control gain according to the difference between the rate of slip of the driving wheels and the predetermined target value and enlarges the control gain by adding a positive correction value to the difference when the turning condition detecting means detects that the vehicle is making a turn.

In the traction control system of the present invention, the control gain of the engine control means is enlarged when the vehicle is making a turn as compared with when the vehicle is running straight. Accordingly, the output power of the engine can be quickly reduced to a target value, and a sufficient gripping force of the driving wheels to resist the lateral acceleration can be obtained, whereby side slip during turning can be effectively prevented and the running stability of the vehicle can be improved.

In the embodiment where the turning angle of the steering wheel or the lateral acceleration of the vehicle is detected and it is determined that the vehicle is making turn when a value derived from one of the turning angle of the steering wheel and the lateral acceleration exceeds a first reference value, the control gain is increased only when the vehicle is actually making a turn in response to operation of the driver and such a problem that the engine torque is accidentally reduced and the running condition of the vehicle comes to deviate from the driver's feeling can be avoided.

In the embodiment where the control gain which has been enlarged is reduced when the value derived from one of the turning angle of the steering wheel and the lateral acceleration exceeds a second reference value larger than the first reference value, increase of the control gain is suppressed in the case where the steering angle is excessively turned or an excessive lateral acceleration is generated, whereby divergence of the rate of slip, i.e., deterioration in convergence of the rate of slip on the target value due to excessive increase in the control gain can be avoided, and reliability of the traction control can be ensured.

In the embodiment where the control gain setting means enlarges the control gain when the vehicle is making a turn by adding a positive correction value to the difference between the actual rate of slip and the target rate of slip and setting the control gain on the basis of the difference between the actual rate of slip and the target rate of slip which is larger than the actual value, the apparent difference between the actual rate of slip and the target rate of slip does not reduces when the rotational speed of the driving wheels reduces during turning and the calculated rate of slip reduces, whereby a sufficient engine control variable can be obtained.

DESCRIPTION OF THE PREFERRED EMBODIMENTS

Figure 1:
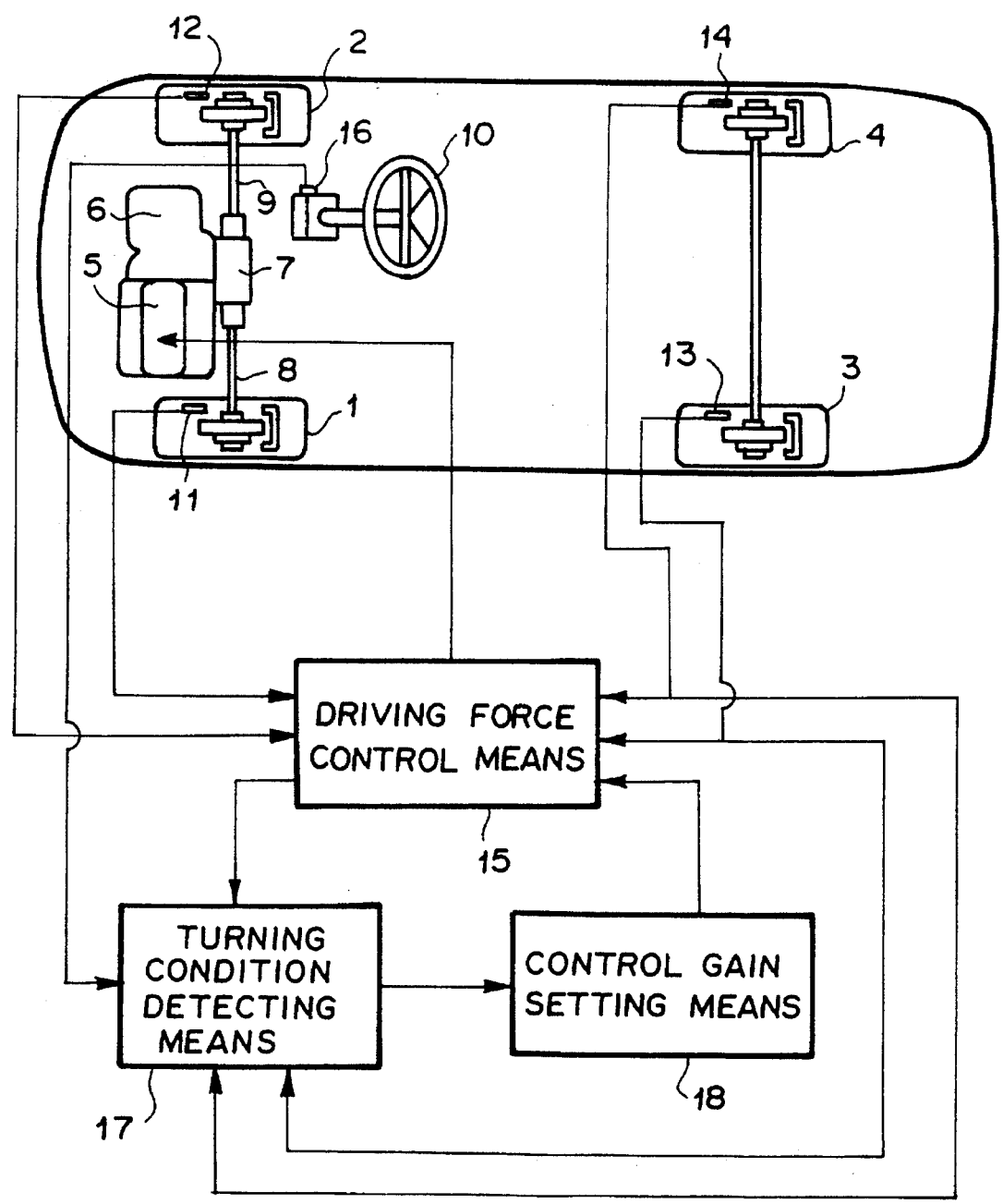
FIG. 1 is a schematic view of a vehicle provided with a traction control system in accordance with an embodiment of the present invention.

In FIG. 1, a vehicle is provided with left and right front wheels 1 and 2, left and right rear wheels 3 and 4 and an engine 5. The engine 5 is mounted on the front of the vehicle and its output torque is transmitted to the front wheels 1 and 2 through a transmission 6, a differential 7 and left and right drive shafts 8 and 9. That is, in this vehicle, the front wheels 1 and 2 are the driving wheels and the rear wheels 3 and 4 are the driven wheels. The front wheels 1 and 2 are turned by a steering wheel 10.

Wheel speed sensors 11 to 14 respectively for detecting the wheel speeds of the left and right front wheels 1 and 2 and the left and right rear wheels 3 and 4 are provided. An engine control system 15 calculates the rate of slip of the driving wheels 1 and 2 on the basis of the wheel speeds detected by the wheel speed sensors 11 to 14 and, when the rate of slip of the driving wheels 1 and 2 exceeds a predetermined threshold value Ss for starting the traction control, controls the driving force transmitted to the driving wheels 1 and 2 by controlling the output power of the engine 5 so that the rate of slip of the driving wheels 1 and 2 converges on a predetermined target value. A steering angle sensor 16 detects the turning angle of the steering wheel 10 and a turning condition detecting means 17 detects the condition of turning of the vehicle on the basis of the steering angle detected by the steering angle sensor 16 or on the basis of the lateral acceleration of the vehicle. On the basis of the condition of turning of the vehicle, a control gain setting means 18 adjusts a control gain on the basis of which the engine control system 15 reduces the engine output power.

Figure 2:
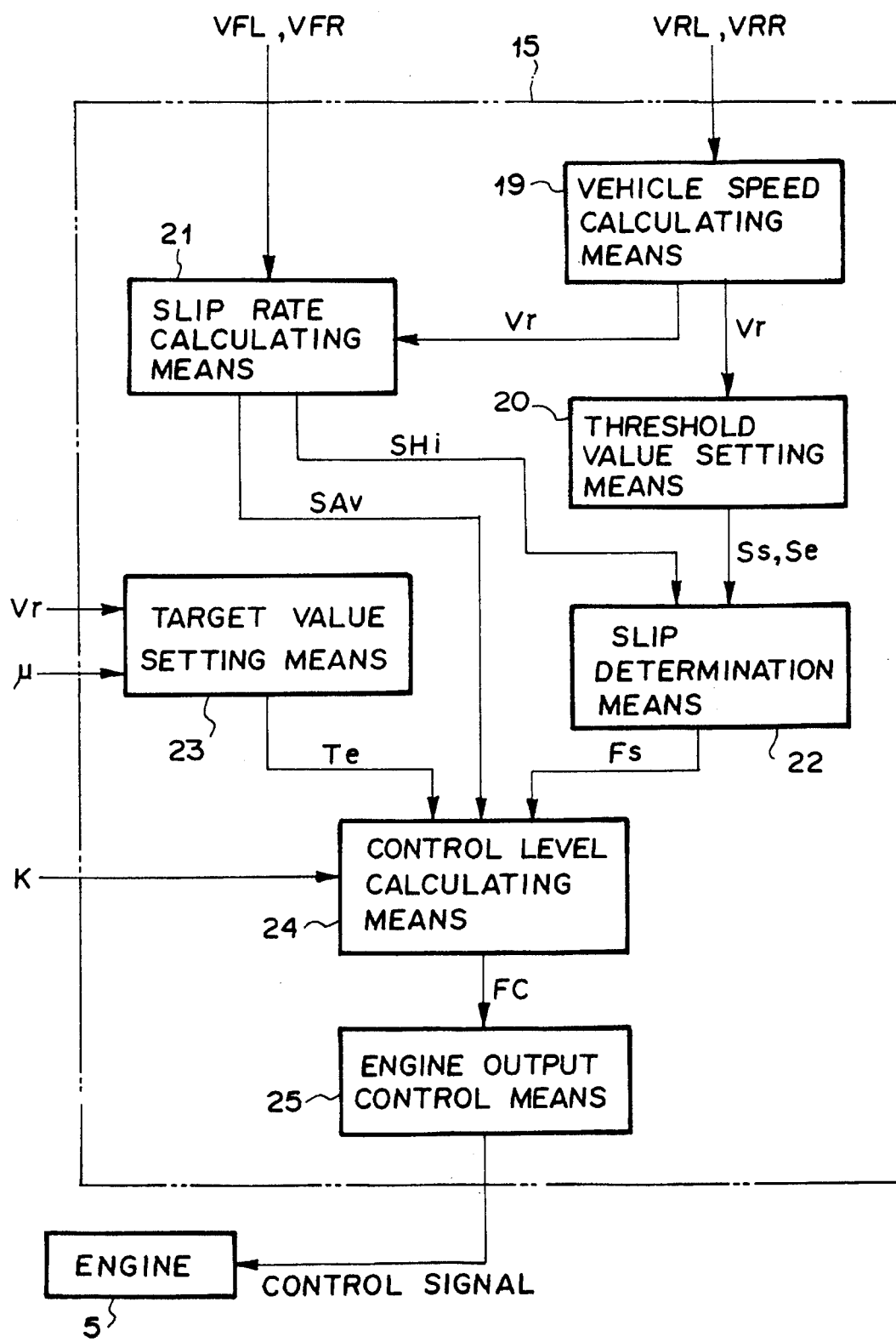
FIG. 2 is a schematic view showing the engine control system of the traction control system.

As shown in FIG. 2, the engine control system 15 is an electronic-control type control unit and comprises a vehicle speed calculating means 19, a threshold value setting means 20 which sets threshold values for determining whether the driving wheels 1 and 2 are slipping, a slip rate calculating means 21 which calculates the rate of slip of the driving wheels 1 and 2, a slip determination means 22 which determines whether the driving wheels 1 and 2 are slipping, a target value setting means 23 which sets a target value of the rate of slip on which the rate of slip of the driving wheels 1 and 2 is to converge, a control level calculating means 24 and an engine output control means 25 which control the output power of the engine 5.

Basic operation of the traction control will be described hereinbelow.

The vehicle speed calculating means 19 adopts, as the vehicle speed Vr, for instance, the lower of the wheel speeds VRL and VRR of the left and right rear wheels 3 and 4 (the driven wheels) detected by the wheel speed sensors 13 and 14.

Then the threshold value setting means 20 calculates the acceleration Vg of the vehicle on the basis of the rate of change in the vehicle speed Vr, and sets a friction coefficient $\mu$ of the road surface to a value determined according to the vehicle speed Vr and the acceleration Vg of the vehicle referring to a $\mu$ table (table 1) where the friction coefficient $\mu$ of the road surface is related to the vehicle speed Vr and the acceleration Vg of the vehicle. As can be seen from table 1, the friction coefficient $\mu$ of the road surface is increased with increase in the vehicle speed Vr and in the acceleration Vg of the vehicle.

TABLE 1

| | Vr(km/h) 0 ———————————→ high | | | | | | | |
|---|---|---|---|---|---|---|---|---|
| Vg(g) 0 | 1 | 1 | 2 | 2 | 3 | 3 | 4 | 4 | 5 |
| | 1 | 1 | 2 | 2 | 3 | 4 | 4 | 5 | 5 |
| | 1 | 1 | 2 | 3 | 3 | 4 | 4 | 5 | 5 |
| | 1 | 1 | 2 | 3 | 4 | 4 | 5 | 5 | 5 |
| | 1 | 1 | 2 | 3 | 4 | 5 | 5 | 5 | 5 |
| | 1 | 2 | 2 | 4 | 4 | 5 | 5 | 5 | 5 |
| ↓ | 1 | 2 | 3 | 4 | 5 | 5 | 5 | 5 | 5 |
| high | 1 | 2 | 3 | 5 | 5 | 5 | 5 | 5 | 5 |

Then the threshold value setting means 20 sets a threshold value Ss for starting the traction control and a threshold value Se for terminating the traction control on the basis of the vehicle speed Vr and the friction coefficient $\mu$ of the road surface referring to preset threshold value maps. The threshold value Ss for starting the traction control is set larger than the threshold value Se for terminating the traction control.

The slip rate calculating means 21 calculates the rates of slip SL and SR of the left and right front wheels 1 and 2 by subtracting the vehicle speed Vr from the driving wheel speeds VFL and VFR (the wheel speeds of the left and right front wheels 1 and 2) detected by the wheel speed sensors 11 and 12, and averages the rates of slip SL and SR to calculate an average rate of slip SAv. Then the slip rate calculating means 21 adopts the larger of the rates of slip SL and SR of the left and right front wheels 1 and 2 as a maximum rate of slip SHi.

Then the slip determination means 22 compares the maximum rate of slip SHi with the threshold value Ss for starting the traction control from the threshold value setting means 20, and when the former is larger than the latter, the slip determination means 22 determines that the front wheels 1 and 2 are slipping and sets slip flag Fs to 1. When the maximum rate of slip SHi comes to be smaller than the threshold value Se for terminating the traction control, the slip determination means 22 determines that the driving wheels 1 and 2 are not slipping and resets the slip flag Fs to 0, whereby the traction control is terminated.

The target value setting means 23 sets a target rate of slip Te for the engine control according to a map in which the target rate of slip Te is related to the vehicle speed Vr and the friction coefficient μ of the road surface.

Then the control level calculating means 24 calculates the difference EN between the target rate of slip Te for the engine control and the average rate of slip SAv. That is, $$EN = SAv - Te \quad (1)$$

The control level calculating means 24 further calculates the rate of change DEN of the difference EN, and reads out a base engine control level A on the basis of the difference EN and the rate of change DEN of the difference EN from a base engine control level map (table 2).

TABLE 2

|  |  | (−) ← | | DEN(g)xy | | | → (+) | |
|---|---|---|---|---|---|---|---|---|
| EN (km/h) | (−) ↑ ↓ (+) | −3 | −2 | −1 | −1 | 0 | +1 | +1 |
| | | −3 | −1 | −1 | 0 | 0 | +1 | +1 |
| | | −2 | −1 | −1 | 0 | 0 | +1 | +1 |
| | | −2 | −1 | 0 | 0 | +1 | +1 | +1 |
| | | −2 | −1 | 0 | 0 | +1 | +1 | +2 |
| | | −1 | −1 | 0 | 0 | +1 | +1 | +2 |
| | | −1 | 0 | 0 | 0 | +1 | +1 | +2 |
| | | −1 | 0 | 0 | 0 | +1 | +1 | +3 |
| | | −1 | 0 | 0 | 0 | +1 | +2 | +3 |

Then control level calculating means 24 sets an engine control level $FC_{(k)}$ within the range of 0 to 11 according to the following formula (2).

$$FC_{(k)} = FC_{(k-1)} A \quad (2)$$

wherein $FC_{(k-1)}$ represents the preceding value of the engine control level $FC_{(k)}$.

The engine output control means 25 effects fuel cut and/or ignition timing retardation according to a fuel cut pattern and the amount of retardation of the ignition timing determined according to the engine control level FC thus obtained referring to a preset engine control table (table 3). Thus the traction is controlled.

TABLE 3

| | cylinder | | | | | | |
|---|---|---|---|---|---|---|---|
| FC | 1 | 2 | 3 | 4 | 5 | 6 | retard |
| 0 | | | | | | | |
| 1 | | | | | | | 5° |
| 2 | | | | | | | 15° |
| 3 | x | x | | | | | |
| 4 | x | x | | | | | |
| 5 | x | x | | | | | 10° |
| 6 | x | x | x | | | | |
| 7 | x | x | x | | | | 10° |
| 8 | x | x | x | x | | | |
| 9 | x | x | x | x | | | 10° |
| 10 | x | x | x | x | x | | |
| 11 | x | x | x | x | x | x | |

In table 3, x indicates that fuel supply to the corresponding cylinder is to be cut.

The turning condition detecting means 17 and the control gain setting means 18 which form am important feature of the present invention will be described hereinbelow.

Figure 3:
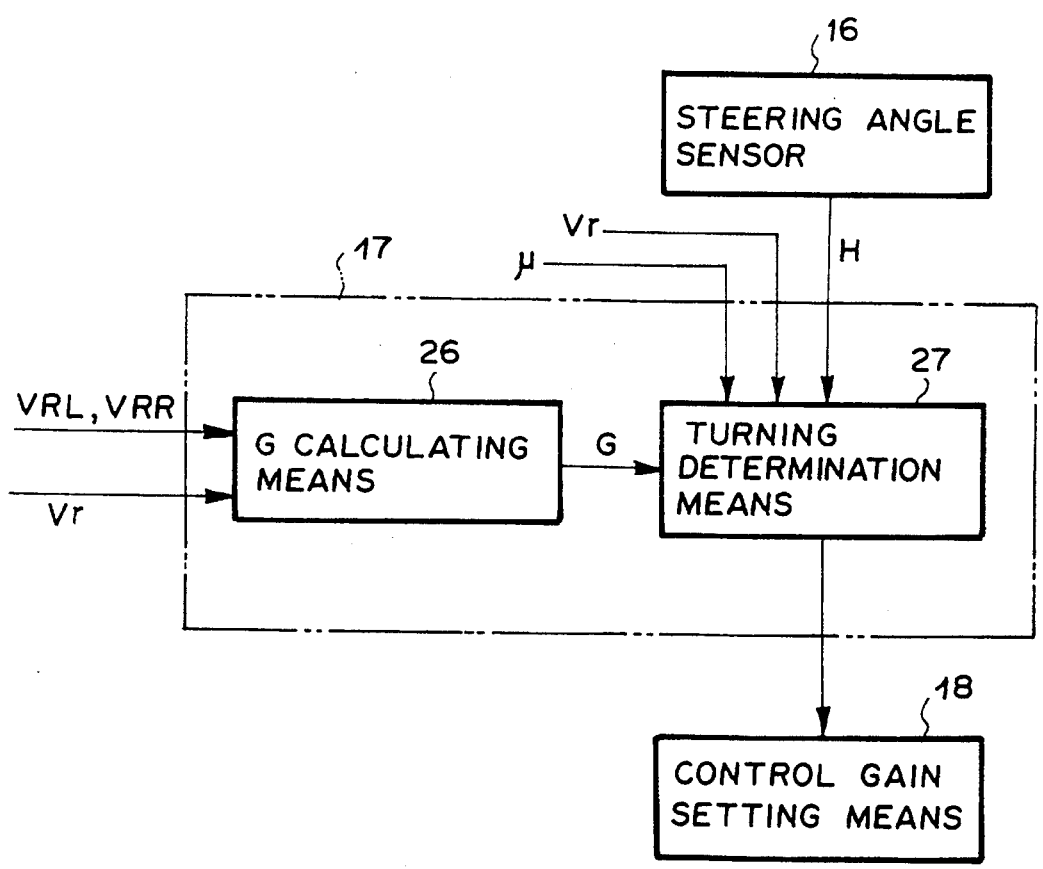
FIG. 3 is a schematic view showing the turning condition detecting means.

As shown in FIG. 3, the turning condition detecting means 17 includes a lateral acceleration calculating means 26 and a turning determination means 27.

The steering angle sensor 16 detects the absolute value H of the turning angle of the steering wheel 10 (to be sometimes referred to simply as "the steering angle", hereinbelow) and outputs the steering angle H to the turning determination means 27.

The lateral acceleration calculating means 26 calculates the turning radius Rr of the vehicle on the basis of the driven wheel speeds VRL and VRR detected by the wheel speed sensors 13 and 14 according to the following formula (3).

$$Rr = Min(VRL, VRR) \times T / |VRL - VRR| + \frac{1}{2} \times T \quad (3)$$

In the formula (3), Min(VRL,VRR) represents the lower of the driven wheel speeds VRL and VRR, |VRL-VRR| represents the absolute value of the difference between the driven wheel speeds VRL and VRR, and T represents the tread of the vehicle (e.g., 1.7m).

Then the lateral acceleration calculating means 26 calculates the lateral acceleration G on the basis of the turning radius Rr thus obtained and the vehicle speed Vr calculated by the vehicle speed calculating means 19 according to the following formula (4).

$$G = (Vr)^2 \times (1/R) \times (1/127) \quad (4)$$

The turning determination means 27 reads out a reference value Ho of the steering angle H and a reference value Go of the lateral acceleration G corresponding to the vehicle speed Vr calculated by the vehicle speed calculating means 19 and the friction coefficient μ of the road surface set by the threshold value setting means 20 respectively from reference value tables (table 4 and table 5) for the steering angle and the lateral acceleration which have been set using the vehicle speed Vr and the friction coefficient μ of the road surface as parameters.

TABLE 4

| | | 0 → Vr(km/h) → high | | | | | | | |
|---|---|---|---|---|---|---|---|---|---|
| μ | 1 | 20 | 20 | 20 | 15 | 15 | 10 | 10 | 8 | 8 |
| | 2 | 20 | 20 | 15 | 15 | 10 | 10 | 8 | 8 | 8 |
| | 3 | 20 | 15 | 15 | 10 | 10 | 8 | 8 | 8 | 5 |
| | 4 | 15 | 15 | 10 | 10 | 8 | 8 | 8 | 5 | 5 |
| | 5 | 15 | 10 | 10 | 8 | 8 | 8 | 5 | 5 | 5 |

TABLE 5

| | | 0 → Vr(km/h) → high | | | | | | | |
|---|---|---|---|---|---|---|---|---|---|
| μ | 1 | 5 | 5 | 5 | 4 | 4 | 3 | 3 | 2 | 2 |
| | 2 | 5 | 5 | 4 | 4 | 3 | 3 | 2 | 2 | 2 |
| | 3 | 5 | 4 | 4 | 3 | 3 | 2 | 2 | 2 | 1 |
| | 4 | 4 | 4 | 3 | 3 | 2 | 2 | 2 | 1 | 1 |
| | 5 | 4 | 3 | 3 | 2 | 2 | 2 | 1 | 1 | 1 |

The turning determination means 27 compares the steering angle H and the lateral acceleration G obtained by the steering angle sensor 16 and the lateral acceleration calculating means 26 respectively with the reference values Ho and Go read out from tables 4 and 5. When one or both of the steering angle H and the lateral acceleration G is larger than the corresponding reference value, the turning determination means 27 determines that the vehicle is making a turn, and otherwise the turning determination means 27 determines that the vehicle is not making a turn.

When the turning determination means 27 determines that the vehicle is making a turn, the control gain setting means 18 outputs a positive correction value K to the control level calculating means 24 and the control level calculating means 24 adds the correction value K to the difference EN calculated according to the formula (1). That is, $$EN=(SAv-Te)+K \qquad (5)$$

The correction value K is related to the steering angle H as shown in the following table 6.

TABLE 6

| H(θ) | -5 | 10 | 15 | 18 | 20 | 22 | 24 | 26 | 28 | 30~ |
|---|---|---|---|---|---|---|---|---|---|---|
| K(km/h) | 0 | 1 | 2 | 3 | 4 | 5 | 6 | 3 | 1 | 0 |

That is, since the control gain setting means 18 reads out a correction value K which is set according to the value of the steering angle H and the control level calculating means 24 adds the correction value K to the difference EN between the target rate of slip Te and the average rate of slip SAv, the difference EN is increased by the correction value K when the vehicle is making a turn and the control level calculating means 24 reads out the base engine control level A from the base engine control level map on the basis of the increased difference EN. Accordingly, the value of the base engine control level A read out becomes larger, and the engine control level FC obtained on the basis of the larger base engine control level A according to the formula (2) is increased. Thus, the engine output power is more suppressed. For example when the steering angle H is 15°, the correction value K is 2 km/h and the difference EN is increased by 2 km/h, whereby the control gain for engine output power reduction is enlarged.

In this particular embodiment, the correction value K is increased with increase in the steering angle H up to 24° and when the steering angle H exceeds 24°, the correction value K is decreased with increase in the steering angle H up to 30°, over which the correction value K is nullified. That is, the control gain for the engine output power reduction is decreased with increase in the steering angle H above 24° and increase in the control gain is nullified when the steering angle H exceeds 30°.

With this arrangement, deterioration in convergence of the rate of slip on the target value due to increase in the control gain can be avoided, and reliability of the traction control can be ensured.

Further since the reference values Ho and Go for determining whether the vehicle is making a turn are set according to the vehicle speed and the friction coefficient of the road surface, the control gain is increased at an optimal timing during the turn depending on the running conditions such as the vehicle speed and the condition of the road surface.

Figure 4:
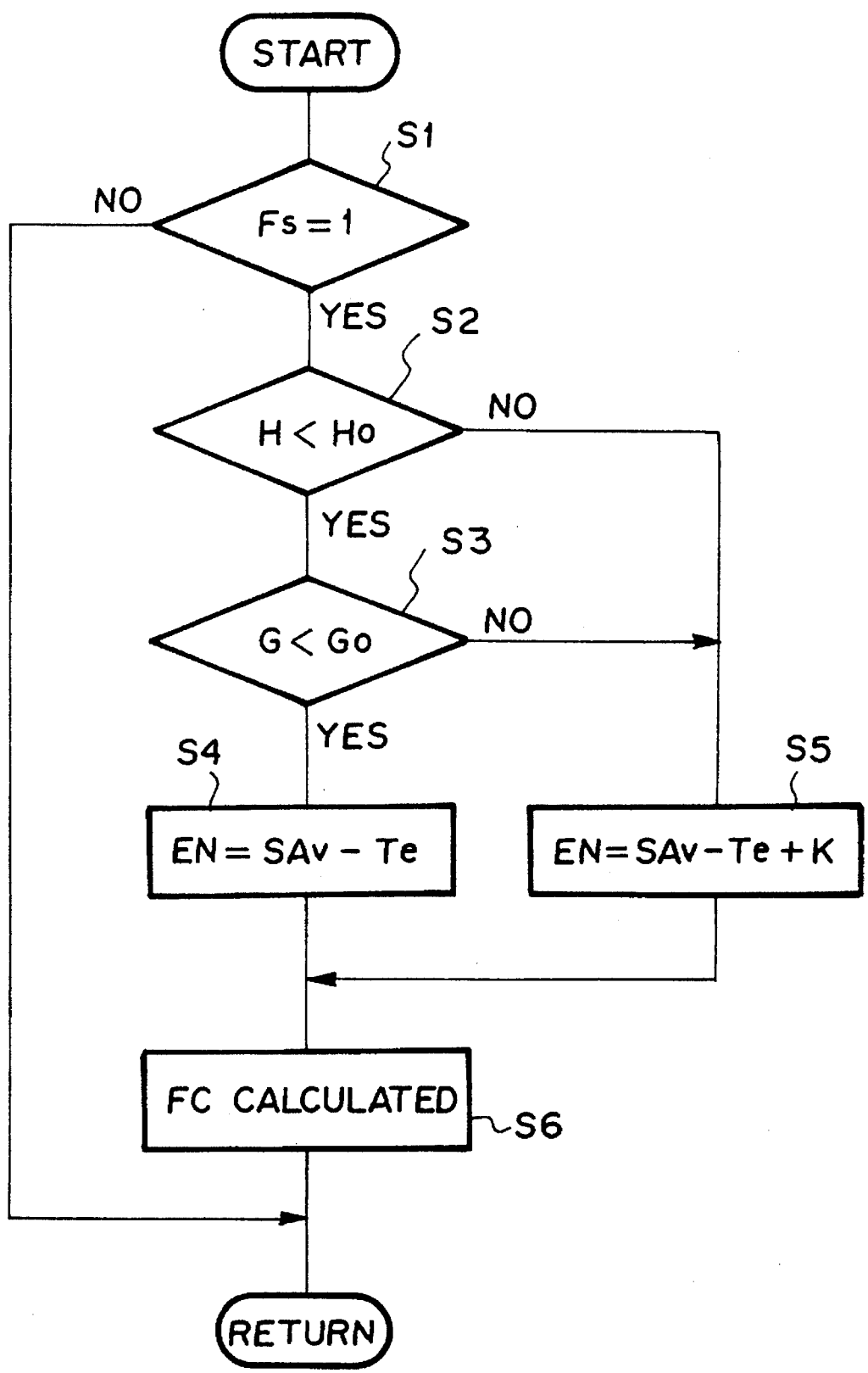
FIG. 4 is a flow chart for illustrating the operation of the traction control system.

The operation of the traction control system of this embodiment will be described with reference to the flow chart shown in FIG. 4.

In step S1, it is determined whether the traction control is being effected. When it is determined that the traction control is being effected, it is determined in step S2 whether the steering angle H is smaller than the reference value Ho. When it is determined that the steering angle H is smaller than the reference value Ho, then it is determined whether the lateral acceleration G is smaller than the reference value Go. When it is determined that the lateral acceleration G is smaller than the reference value Go, the difference EN in the rate of slip is added with no correction value. (step S4) When it is determined that the steering angle H is not smaller than the reference value Ho or it is determined that the lateral acceleration G is not smaller than the reference value Go, the difference EN in the rate of slip is added with the correction value K. (step S5) Then in step S6, the base engine control level and the engine control level are calculated on the basis of the difference EN calculated in step S4 or S5.

Though, in this embodiment, the lateral acceleration G of the vehicle is calculated on the basis of the driven wheel speed and the vehicle speed, the lateral acceleration G may be directly detected by a lateral acceleration sensor.

The values shown in tables 1 to 6 are for the purpose of illustration and may be changed according to a desired control pattern of the traction control system, a desired running performance of the vehicle and the like.

Further though, in the embodiment described above, the correction value K is determined according to the steering angle H as shown in table 6, the correction value K may be determined according to the lateral acceleration G.

What is claimed is:

1. A traction control system for a vehicle having an engine, driving wheels and driven wheels comprising a driven wheel speed detecting means which detects the rotational speed of the driven wheels, a driving wheel speed detecting means which detects the rotational speed of the driving wheels, a vehicle speed detecting means which calculates the vehicle speed on the basis of the rotational speed of the driven wheels detected by the driven wheel speed detecting means, a slip rate calculating means which calculates the rate of slip of the driving wheels on the basis of the rotational speed of the driving wheels detected by the driving wheel speed detecting means and the vehicle speed calculated by the vehicle speed calculating means, an engine control means which controls the output power of the engine with a control gain so that the rate of slip of the driving wheels converges on a predetermined target value when the rate of slip of the driving wheels exceeds a predetermined threshold value, a control gain setting means which sets the control gain with which the engine control means controls the output power of the engine, and a turning condition detecting means which detects that the vehicle is making a turn, said control gain setting means setting the control gain of the engine control means for reducing the output power of the engine to a greater degree when the turning condition detecting means detects that the vehicle is making a turn than when the vehicle is running straight to provide a faster response for convergence of the engine output power on the predetermined target value.

2. A traction control system as defined in claim 1 in which said turning condition detecting means includes a steering angle detecting means which detects the turning angle of a steering wheel and a lateral acceleration detecting means which detects the lateral acceleration of the vehicle, and the turning condition detecting means detects that the vehicle is making a turn when a value derived from one of the turning angle of the steering wheel and the lateral acceleration exceeds a first reference value.

3. A traction control system as defined in claim 1 in which said control gain setting means sets the control gain according to the difference between the rate of slip of the driving wheels and the predetermined target value and enlarges the control gain by adding a positive correction value to the difference when the turning condition detecting means detects that the vehicle is making a turn.

4. A traction control system as defined in claim 3 in which said correction value is increased with increase in a value derived from one of the turning angle of a steering wheel detected by a steering angle detecting means and the lateral acceleration of the vehicle detected by a lateral acceleration detecting means.

5. A traction control system as defined in claim 1 in which said turning condition detecting means includes a steering angle detecting means which detects the turning angle of a steering wheel and a lateral acceleration detecting means which detects the lateral acceleration of the vehicle, and the turning condition detecting means compares a value derived from the turning angle of the steering wheel with a reference value and a value derived from the lateral acceleration with a reference value and detects that the vehicle is making a turn when at least one of the values derived from the turning angle of the steering wheel and the lateral acceleration exceeds the corresponding reference value.

6. A traction control system for a vehicle having an engine, driving wheels and driven wheels comprising a driven wheel speed detecting means which detects the rotational speed of the driven wheels, a driving wheel speed detecting means which detects the rotational speed of the driving wheels, a vehicle speed detecting means which calculates the vehicle speed on the basis of the rotational speed of the driven wheels detected by the driven wheel speed detecting means, a slip rate calculating means which calculates the rate of slip of the driving wheels on the basis of the rotational speed of the driving wheels detected by the driving wheel speed detecting means and the vehicle speed calculated by the vehicle speed calculating means, an engine control means which controls the output power of the engine so that output power of the engine converges on a predetermined target value when the rate of slip of the driving wheels exceeds a wheels exceeds a predetermined threshold value, a turning condition detecting means which detects that the vehicle is making a turn, and an engine control correcting means which corrects the response for convergence of the output of the engine on the predetermined target value to be faster when the turning condition detecting means detects that the vehicle is making a turn than when the vehicle is running straight.

7. A traction control system for a vehicle having an engine, driving wheels and driven wheels comprising a driven wheel speed detecting means which detects the rotational speed of the driven wheels, a driving wheel speed detecting means which detects the rotational speed of the driving wheels, a vehicle speed detecting means which calculates the vehicles speed on the basis of the rotational speed of the driven wheels detected by the driven wheel speed detecting means, a slip rate calculating means which calculates the rate of slip of the driving wheels on the basis of the rotational speed of the driving wheels detected by the driving wheel speed detecting means and the vehicle speed calculated by the vehicle speed calculating means, an engine control means which controls the output power of the engine with a control gain so that the rate of slip of the driving wheels converges on a predetermined target value when the rate of slip of the driving wheels exceeds a predetermined threshold value, a control gain setting means which sets the control gain with which the engine control means controls the output power of the engine, and a turning condition detecting means which detects that the vehicle is making a turn, said control gain setting means setting the control gain of the engine control means for reducing the output power of the engine to be larger when the turning condition detecting means detects that the vehicle is making a turn than when the vehicle is running straight;

wherein said turning condition detecting means includes a steering angle detecting means which detects the turning angle of a steering wheel and a lateral acceleration detecting means which detects the lateral acceleration of the vehicle, and the turning condition detecting means detects that the vehicle is making a turn when a value derived from one of the turning angle of the steering wheel and the lateral acceleration exceeds a first reference value; and said control gain setting means reduces the control gain, which has been enlarged since the value derived from one of the turning angle of the steering wheel and the lateral acceleration exceeds the first reference value, when the value further exceeds a second reference value larger than the first reference value.

8. A traction control system for a vehicle having an engine, driving wheels and driven wheels comprising a driven wheel speed detecting means which detects the rotational speed of the driven wheels, a driving wheel speed detecting means which detects the rotational speed of the driving wheels, a vehicle speed detects the rotational speed of the driving wheels, a vehicle speed detecting means which calculates the vehicle speed on the basis of the rotational speed of the driven wheels detected by the driven wheel speed detecting means, a slip rate calculating means which calculates the rate of slip of the driving wheels on the basis of the rotational speed of the driving wheels detected by the driving wheel speed detecting means and the vehicle speed calculated by the vehicle speed calculating means, an engine control means which controls the output power of the engine with a control gain so that the rate of slip of the driving wheels converges on a predetermined target value when the rate of slip of the driving wheels exceeds a predetermined threshold value, a control gain setting means which sets the control gain with which the engine control means controls the output power of the engine, and a turning condition detecting means which detects that the vehicle is making a turn, said control gain setting means setting the control gain of the engine control means for reducing the output power of the engine to be larger when the turning condition detecting means detects that the vehicle is making a turn than when the vehicle is running straight;

wherein said control gain setting means sets the control gain according to the difference between the rate of slip of the driving wheels and the predetermined target value and enlarges the control gain by adding a positive correction value to the difference when the turning condition detecting means detects that the vehicle is making a turn, said correction value being increased with an increase in a value derived from one of the turning angle of a steering wheel detected by a steering angle detecting means and the lateral acceleration of the vehicle detected by a lateral acceleration detecting means until the value reaches a predetermined value and is reduced with increase in the value over the predetermined value.

\* \* \* \* \*